United States Patent [19]
Blakely et al.

[11] 4,402,121
[45] Sep. 6, 1983

[54] METHOD OF MANUFACTURING HEAT ABSORBING ELEMENTS

[76] Inventors: Stephen W. Blakely, Apt. A, 503 Beacon, Alton, Ill. 62002; Stephen F. Hager, 1121 Taylor Ave., Godfrey, Ill. 62035

[21] Appl. No.: 300,891

[22] Filed: Sep. 10, 1981

[51] Int. Cl.³ .......................................... B23P 15/26
[52] U.S. Cl. ............................................ 29/157.3 A
[58] Field of Search ................. 29/157.3 A, 157.3 B, 29/157.3 R, 157.3 C, 726

[56] References Cited
U.S. PATENT DOCUMENTS

| 4,011,856 | 3/1977 | Gallagher | 126/271 |
| 4,143,448 | 3/1979 | Caster et al. | 29/726 |
| 4,227,511 | 10/1980 | Margen et al. | 126/415 |
| 4,237,971 | 12/1980 | Olsson et al. | 165/171 |

Primary Examiner—Francis S. Husar
Assistant Examiner—V. K. Rising
Attorney, Agent, or Firm—Senniger, Powers, Leavitt and Roedel

[57] ABSTRACT

A method of manufacturing a heat absorbing element, the method comprising combining a first metal strip face-to-face with a second metal strip having a width greater than that of the first to form a composite strip wherein the side margins of the second strip extend laterally outwardly beyond the side edges of the first. The composite strip thus has a central portion extending longitudinally of the strip comprising a double thickness of strip and portions extending longitudinally of the strip on opposite sides of the central portion each comprising one less thickness of strip than the central portion. The central portion of the composite strip is then formed into a tube, and the tube is closed along a line extending longitudinally of the tube with the side portions of the composite strip extending outwardly away from the seam to form a pair of fins along the tube.

5 Claims, 5 Drawing Figures

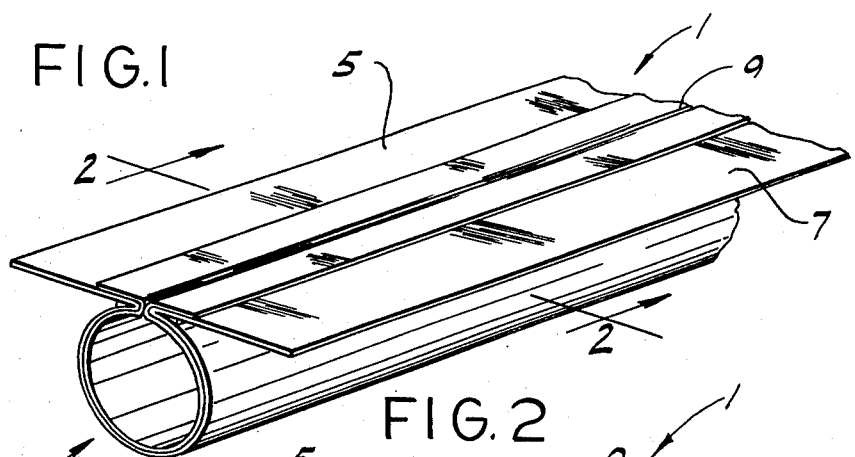
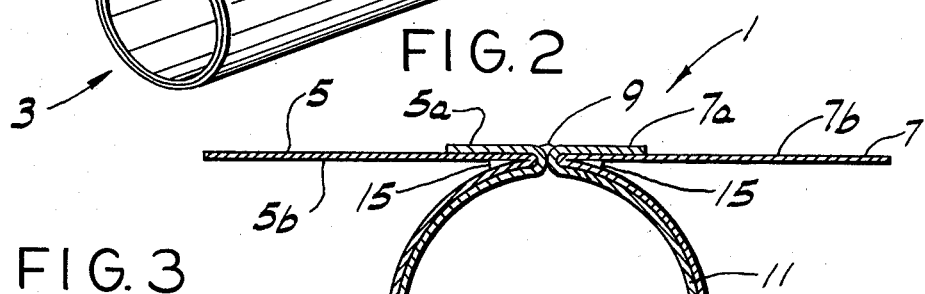
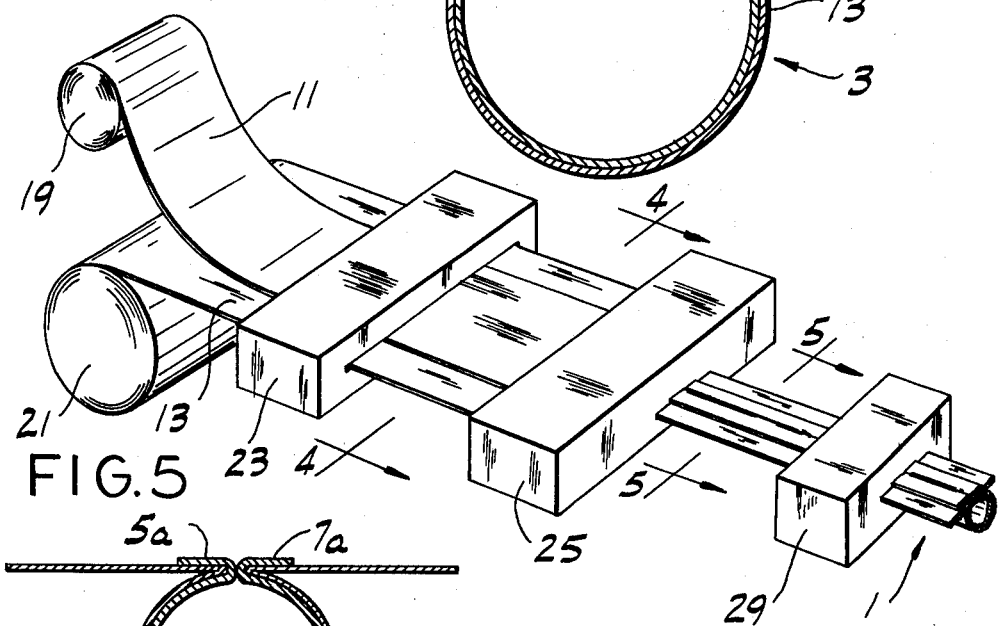
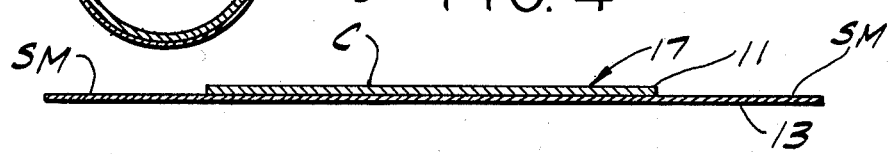

METHOD OF MANUFACTURING HEAT ABSORBING ELEMENTS

BACKGROUND OF THE INVENTION

The present invention relates generally to heat absorbing devices and, more particularly, to a method of making a heat absorbing element useful in solar collection, for example.

This invention is especially concerned with heat absorbing elements of the tube-and-fin type where solar radiation incident on the fins is converted into heat energy and conducted by the fins to a tube or tubes containing a suitable heat transfer fluid. To withstand operating fluid pressure and temperature conditions, and to meet various code requirements, the wall thickness of the tube(s) must be rather generous (e.g., 0.020"). The thickness of the fins, on the other hand, need not be as great (e.g., 0.005").

Heretofore, heat absorbing elements of the tube-and-fin type have been produced in many ways, such as by extrusion. In this process, however, the fins and tubes are typically extruded to the same thickness, that is, to the thickness required for the tube walls. Thus the fins are excessively thick and an unnecessary amount of material (e.g., aluminum) is consumed which results in higher manufacturing costs. Absorbers have also been made by bonding tubes (e.g., copper or aluminum tubes) directly to metal sheets (e.g., aluminum sheets). In this process, the thicknesses of the tube walls and fins can be controlled, but bonding the tubes to the sheets raises other problems.

Reference may be made to U.S. Pat. Nos. 4,237,971, 4,227,511 and 4,011,856 for a description of various solar heating devices generally in the field of this invention.

SUMMARY OF THE INVENTION

Among the several objects of this invention may be noted the provision of an improved method of manufacturing a heat absorbing element of the tube-and-fin type wherein the thickness of the fins is considerably less than the wall thickness of the tubes for economical manufacture; the provision of such a method whereby the tubes of heat absorbing elements may be made of one metal, such as a corrosion-resistant metal, and the fins made of a different metal; and the provision of such a method whereby absorbing elements are produced in a continuous process at relatively high speed for reducing manufacturing costs.

In general, the method of the present invention for manufacturing the aforementioned absorbing element comprises combining a first metal strip face-to-face with a second metal strip having a width greater than the width of the first strip to form a composite metal strip wherein the side margins of the second strip extend laterally outwardly beyond the side edges of the first strip, the composite strip thus having a central portion extending longitudinally of the strip comprising a double thickness of strip and portions extending longitudinally of the strip on opposite sides of the central portion, each comrising one less thickness of strip than the central portion. The method further comprises forming the central portion of the composite strip into a tube extending longitudinally of the strip and seaming the tube closed along a line extending longitudinally of the tube, the side portions of the composite strip extending laterally outwardly away from the seam to form a pair of fins along the tube.

Other objects and features will be in part apparent and in part pointed out hereinafter.

BRIEF DESCRIPTION OF THE DRAWINGS

FIG. 1 is a perspective of a heat absorbing element made in accordance with a method of the present invention;

FIG. 2 is an enlarged transverse section on line 2—2 of FIG. 1;

FIG. 3 is a diagrammatic perspective illustrating the manufacture of heat absorbing elements in accordance with the method of this invention;

FIG. 4 is an enlarged section on line 4—4 of FIG. 3; and

FIG. 5 is an enlarged section on line 5—5 of FIG. 3.

Corresponding reference characters indicate corresponding parts throughout the several views of the drawings.

DESCRIPTION OF THE PREFERRED EMBODIMENT

Referring now to the drawings, first more particularly to FIGS. 1 and 2, there is generally indicated at 1 an elongate heat absorbing element made according to the method of this invention. As shown, the element comprises a generally cylindrical tube 3 for flow therethrough of a suitable heat transfer fluid (e.g., water), and a pair of generally planar fins 5, 7 extending generally tangentially from the tube. The tube 3 is seamed closed (as by welding) along a line of seam 9 extending longitudinally of the tube. The wall of the tube comprises two thicknesses of metal strip, viz., a first or inner strip 11 and a second or outer strip 13. The fins 5, 7 project in opposite directions from the seam line 9 and have lateral inner portions, designated 5a, 7a, respectively, comprising thicknesses of both of the strips, and lateral outer portions, designated 5b, 7b, respectively, comprising the thickness of ony the outer strip 13. As indicated at 15, the lateral inner portions of the fins, which extend closely adjacent the surface of the tube, are preferably bonded (e.g., by solder or thermal adhesive) to the tube to enhance the conductance of heat from the fins to the tube. To enhance the absorption of radiant energy by the fins, they may be coated with a nonreflective radiation-absorbent coating (e.g., a black oxide coating).

In accordance with this invention, the heat absorbing element 1 is formed from a single composite strip, designated 17, comprising the inner and outer strips 11, 13 bonded together in face-to-face relation. As shown in FIG. 4, the inner strip 11 of this composite strip is generally centrally located on the outer strip with its longitudinal centerline extending generally along that of the outer strip. The side margins of the outer strip, which has a width greater than that of the inner strip, extend laterally outwardly beyond the side edges of the inner strip. The composite strip thus has a central portion, designated C, of double thickness for being formed into the tube 3 and the lateral inner portions 5a, 7a of the fins, and a pair of longitudinal side margins, each designed SM, of single thickness for being formed into the lateral outer portions 5b, 7b of the fins. The outer strip 11 is of a metal having suitable strength and thermal characteristics (e.g., aluminum, copper or a copper alloy), and is of a thickness (e.g., 0.005") corresponding to the thickness of the fin necessary for optimum thermal efficiency. The inner strip 13 is of a metal having suitable strength, thermal, and corrosion-resistant characteristics (e.g., a copper-nickel alloy) and is narrower and thicker (e.g., 0.020") than the outer strip, its thickness being such that the tube 3 can withstand the operating temperatures and pressures of the heat transfer fluid flowing therethrough.

FIG. 3 illustrates in schematic form a method of making the heat absorbing element 1. In this method, a continuous inner strip 11 and a continuous outer strip 13 are fed forward (from left to right as viewed in FIG. 3) from respective supply rolls 19, 21 to a combining station 23. As they approach the combining station, the strips are brought together in face-to-face relation, with the inner strip centered on the outer strip. At the combining station 23, the srips are joined, by a suitable mechanical bonding process such as "staking" or by the application of a layer of suitable adhesive (not shown) between the strips, to form the planar composite strip 17 shown in FIG. 4. This composite strip is fed forward (toward the right) from station 23 to a tube-forming station 25 where it is roll-formed by suitable tooling into the tube 3 shown in FIG. 5 having lateral inner fin portions 5a, 7a brought into edge-to-edge engagement with each other. This tube 3 is then seamed closed by suitable continuous welding apparatus and the lateral inner fin portions 5a, 7a are bonded to the surface of the tube 3 at a station 29 downstream from the tube-forming station. The final step of the process (not illustrated in the drawings) is to sever the continuous heat absorbing element into desired lengths.

The heat absorbing element made according to the method of this invention has superior thermal performance characteristics inasmuch as it is formed from a composite strip comprising two strips, which because they are combined in face-to-face engagement along their entire lengths, are in optimum heat exchange relation with each other. In addition, the element is also economical to manufacture since there is no wastage of metal in the fin area. The fact that the element can be made by a continuous process (rather than a batch process) also reduces production costs.

The method of the present invention may also be used to manufacture a heat absorbing element wherein a plurality of tubes 3 extend side-by-side. This could be accomplished by combining a relatively wide outer strip 13 face-to-face with a plurality of inner strips 11, with the latter extending longitudinally of the outer strip at intervals spaced transversely of the strip. The double-thickness portions of the resultant composite strip could then be roll-formed by suitable tooling into a plurality of parallel tubes, which would be interconnected by the single-thickness portions of the strip.

It will be understood that while the strips 11, 13 are shown in the drawings and described above as constituting the inner and outer strips of the tube, respectively, it is contemplated that the orientation of the strips could be reversed. If the strips were reversed, the inner strip would be of a metal having both good thermal and corrosion-resistance characteristics, and the outer strip would be of a metal having high strength characteristics.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. A method of manufacturing a heat absorbing element comprising:

combining a first metal strip face-to-face with a second metal strip having a width greater than the width of the first strip to form a composite metal strip wherein the side margins of the second strip extend laterally outwardly beyond the side edges of the first strip, the composite strip thus having a central portion extending longitudinally of the strip comprising a double thickness of strip and portions extending longitudinally of the strip on opposite sides of the central portion each comprising one less thickness of strip than the central portion;

forming the central portion of the composite strip into a tube extending longitudinally of the strip; and seaming the tube closed along a line extending longitudinally of the tube, said side portions of the composite strip extending laterally outwardly away from the seam on opposite sides of the seam to form a pair of fins along the tube.

2. The method of claim 1 further comprising bonding said first and second strips together face-to-face to form said composite strip.

3. The method of claim 1 further comprising bending a portion of each fin adjacent the seam into thermal contact with the outer surface of the tube and bonding it thereto.

4. The method of claim 1 wherein said first metal strip is substantially thicker than said second metal strip.

5. The method of claim 1 wherein said first and second strips are of different metals, said first metal strip being of a metal having good corrosion resistance characteristics, and said second metal strip being of a metal having good strength and heat conduction characteristics.

* * * * *